May 29, 1934.　　　　E. G. PARVIN　　　　1,960,976
INVERTER
Filed June 29, 1932　　　2 Sheets-Sheet 1
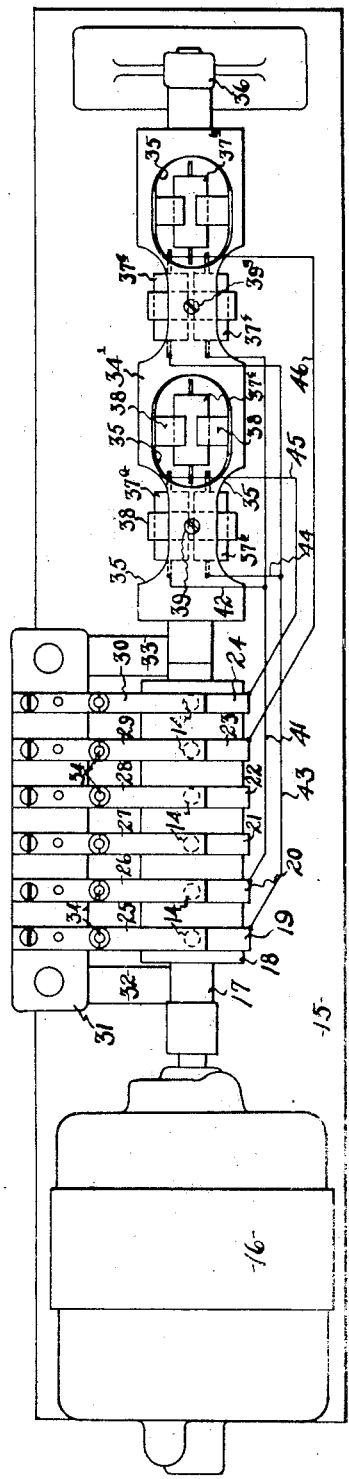
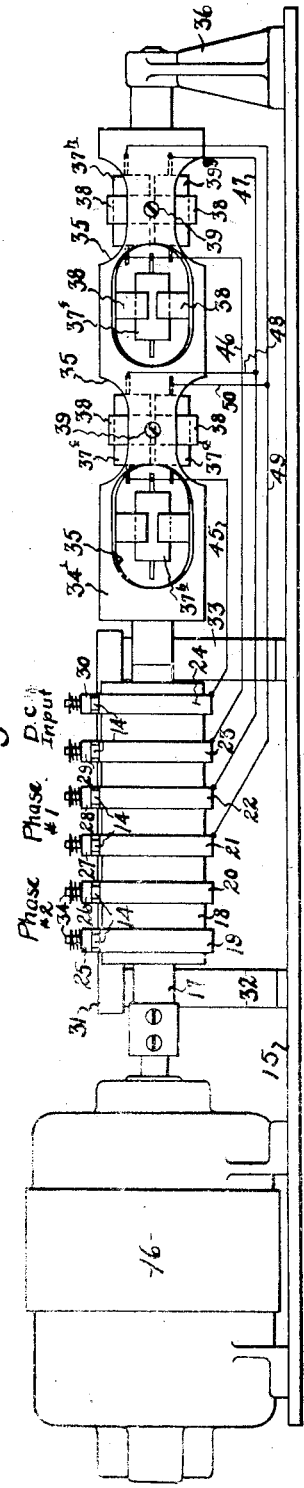
INVENTOR
*Edward G. Parvin*
BY *Darby & Darby*
ATTORNEYS May 29, 1934.  E. G. PARVIN  1,960,976
INVERTER
Filed June 29, 1932  2 Sheets-Sheet 2
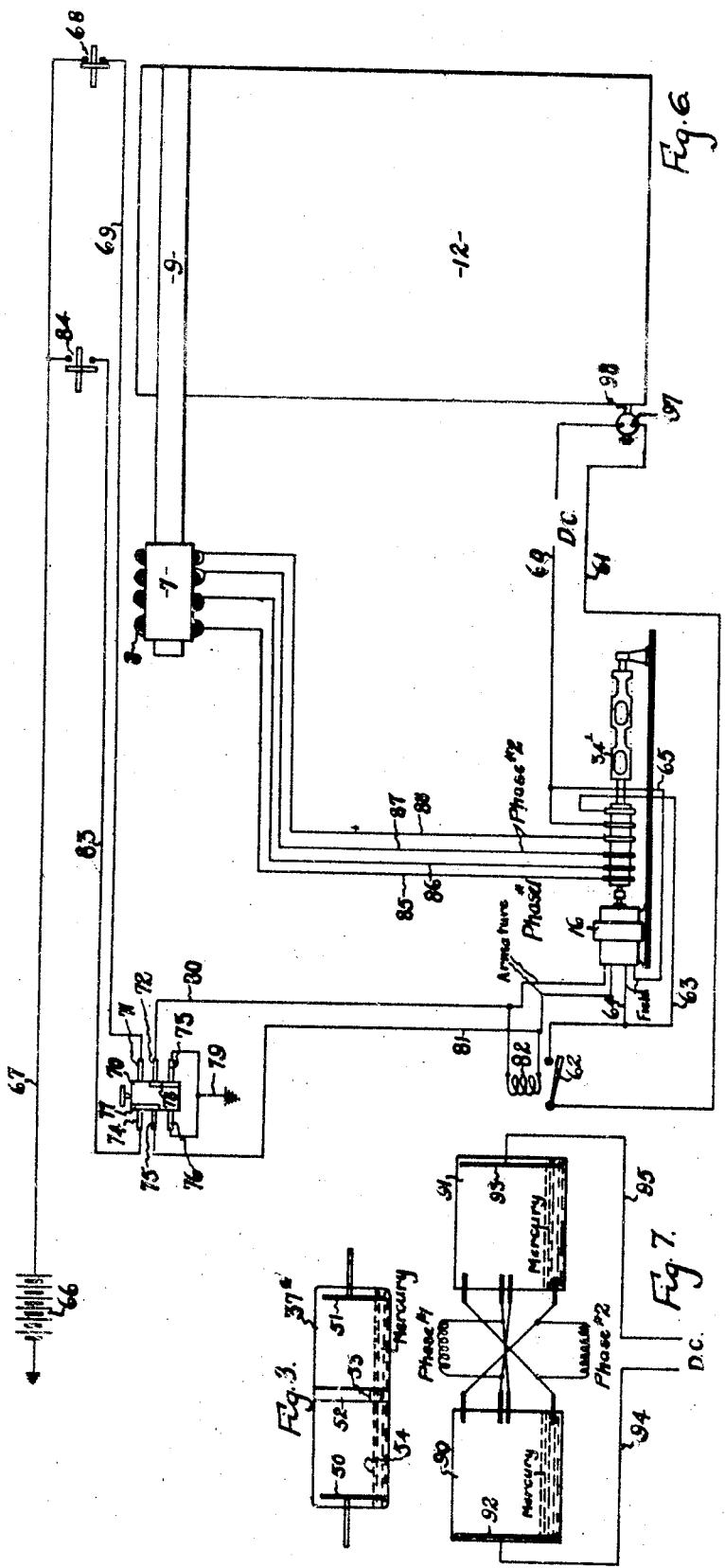
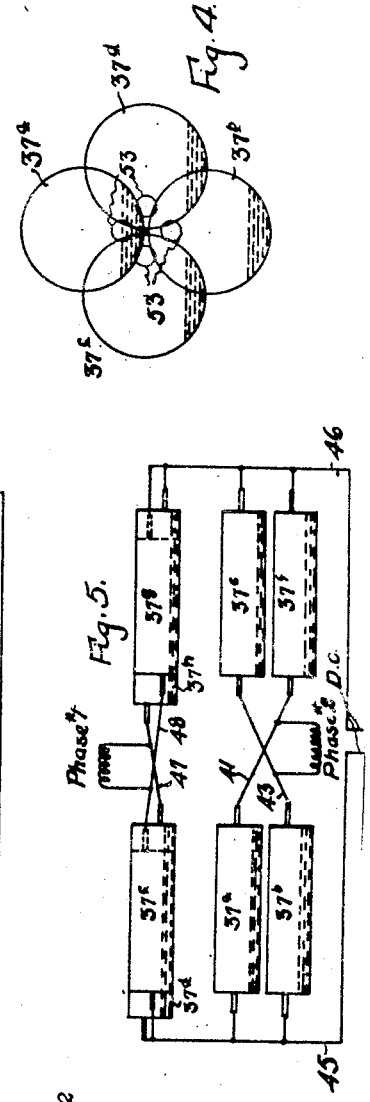
INVENTOR
Edward G. Parvin
BY Darby & Darby
ATTORNEYS.

Patented May 29, 1934

1,960,976

UNITED STATES PATENT OFFICE 1,960,976

INVERTER

Edward G. Parvin, Roselle, N. J., assignor to National Pneumatic Company, New York, N. Y., a corporation of West Virginia Application June 29, 1932, Serial No. 619,844

2 Claims. (Cl. 175—373)

An object of this invention is to provide for use in a door operating system employing a linear induction motor operator mechanism for converting direct current into alternating current for operating the linear induction motor.

Another object of this invention involves the use of a plurality of mercury switches arranged and interconnected to effect the conversion of direct current into alternating current.

These and many other objects as will appear from the following disclosure are secured by means of this invention.

This invention resides substantially in the combination, construction, arrangement and relative location of parts, all as will be described in detail below.

Referring to the drawings,—

Fig. 1 is a top plan view of a converter of direct currents into alternating currents;

Fig. 2 is a side elevational view of this apparatus;

Fig. 3 is a side elevational view of one of the mercury switches employed in the converter;

Fig. 4 is a diagrammatic end elevational view showing the relative position of four of the mercury switches of the converter;

Fig. 5 is a diagrammatic view showing the connections of the mercury switches for converting direct current into two phase alternating current;

Fig. 6 is a diagrammatic view of the complete system as applied to a door;

Fig. 7 is a diagrammatic view of a modified form of mercury switch converter;

Fig. 8 is an end elevational view of one of the mercury switches of the modified apparatus.

An object of this invention is to provide a simple apparatus for converting the available direct current into alternating current of suitable form or frequency to operate linear induction motor door operators.

In Figs. 1 and 2 is shown the unit for converting direct current into alternating current of suitable characteristics and frequency for operating linear induction motor door operators. This apparatus comprises a suitable supporting plate 15 on which is mounted a small direct current motor 16. Secured to the shaft of this motor is a shaft 17, which is connected to a tubular structure 34' having a shaft extension at the other end which is journaled in the standard 36 so that the shaft 17 and tube 34' are rotated as a unit. Secured to the shaft 17 is a drum 18 of insulating material on which are mounted six slip rings 19, 20, 21, 22, 23 and 24. Mounted on the standards 32 and 33 is an insulating slab 31 to which are secured six spring fingers, 25, 26, 27, 28, 29 and 30.

There is one of these fingers for each slip ring, each finger having a contact brush 14 for engaging the rings. These spring fingers are resiliently held in contact with the slip rings by means of springs pressing thereon and held against movement on studs 34. The tube 34' is cut away at a number of points as shown at 35 to provide openings in the wall thereof. Mounted in the tube by means of suitable blocks 38 which are secured by means of set screws 39, are a plurality of mercury switches 37a, 37b, 37c, 37d, 37e, 37f, 37g, and 37h. These mercury switches are of a construction well known in the art and indicated in Fig. 3. Each switch comprises a glass tube having a disc shaped electrode 50 and 51 at each end and provided with a connecting lead as shown. Mounted in the tube to form a transverse wall is the insulating disc 52 having an opening 53 near one edge thereof. In the tube is a pool of mercury 54 which interconnects the electrodes 50 and 51 when the tube is in the position shown in Fig. 3. When it revolves out of this position, the mercury remains at the bottom of the tube and the insulating wall 52 separates the mercury into two pools breaking the circuits between the electrodes. In this converter there are eight of these mercury switches arranged in pairs which lie in planes at right angles to each other. Thus, the first pair comprises the switches 37a and 37b lying in the same plane (the plane of the paper Fig. 1) and lying close to but on opposite sides of the axis of rotation of the tube 34'. The second pair of switches 37c and 37d lie in the same plane which plane is at right angles to the plane of the first set.

The pair of switches 37e and 37g, lie in the same plane as the first set and the last set 37g and 37h lie at right angles to the third set and in the same plane as the second set. The relationship of the switches of either group of four is shown in Fig. 4 which shows their position diagrammatically when viewed from either end along the axis of rotation. As will be apparent from Fig. 4 with the switches in the position shown, only the electrodes of switch 37a are interconnected in that group. In a like manner for the corresponding position of the other set of four switches, the electrodes of switch 37h are interconnected. As already mentioned, the switches of each set are placed as close as possible to their axis of rotation in order to reduce the centrifugal forces acting on the mercury therein.

Slip ring 24 is connected by wire 45 to all of the four adjacent electrodes of the four mercury switches in the first set. Slip ring 23 is similarly connected by wire 46 to all four adjacent electrodes of the four mercury switches of the second set. Slip ring 20 is connected by wire 41 to the left hand electrode of mercury switch 37f. Wire 41 is connected by wire 42 to the left hand electrode of mercury switch 37a. Slip ring 19 is connected by wire 43 to the left hand electrode of mercury switch 37e. Wire 43 is connected by wire 44 to the left hand electrode of mercury switch 37d. Slip ring 21 is connected by wire 49 to the right hand electrode of mercury switch 37g. Wire 49 is connected by wire 50 to the right hand electrode of mercury switch 37d. Slip ring 22 is connected by wire 47 to the right hand electrode of mercury switch 37h. Wire 47 is connected by wire 48 to the right hand electrode of mercury switch 37c.

With this mechanism a two phase alternating current is secured from a D. C. source which has a frequency of approximately three and one-half cycles per second when the motor is operating at approximately 200 revolutions per minute. It will be noted from an examination of Figs. 1, 2 and 5 that current flows through a pair of mercury switches for every 90 degrees of revolution and flows through the alternating pairs of switches of any set in opposite directions.

Referring to Fig. 5 it should be noted that in the actual structure, switch 37c will lie between switches 37a and 37b in front thereof and switch 37d will be in the same position in back thereof. In other words if these four switches were placed in longitudinal coincidence, they would be in a position shown in Fig. 4 but are longitudinally displaced in pairs so that they may be placed as close as possible to the axis of rotation. Referring again to Fig. 5 with the switch in the position shown therein (which corresponds to their position in Fig. 1) current flows from the D. C. source through wire 45, switch 37a, wire 41, phase No. 2, winding wire 43, mercury switch 37e and back through wire 46 to the other side of the current source. This causes the current to build up in phase No. 2 winding and then to die off as the circuit is broken to give the first half of the alternating current wave. Current does not flow at this time through any of the other mercury switches because the hole 53 in the transverse wall of these switches, is in such a position for all the other six switches as indicated for one set in Fig. 4 so that the mercury is divided into two pools insulated in each other. Upon a 90 degree rotation of these switches (assume clockwise rotation Fig. 4) current will flow this time through switch 37c which will now be in the previous position of switch 37a and current will also flow through switch 37g.

In passing from one switch to the other the current must flow through phase No. 1 winding by the way of wires 47 and 48 so that this winding is now energized for the next half of the wave. These windings represent the windings of the stator of the motor. The switches are cross-connected so that the successive half waves or alternations of the current form a composite output current in the form of an alternating current comprising positive and negative alternations. As indicated in Figs. 1 and 2, the switches are connected to the slip rings which are in turn connected to the A. C. output wires and the D. C. input wires.

A complete door operating system is shown in Fig. 6. At 66 is a suitable D. C. current source, one terminal of which is grounded and which source may represent for example, the third rail or trolley, if desired. Of course, suitable voltage providers would be employed in order to cut the voltage down from that of the third rail to a suitable voltage for operation of the door apparatus. However, this is all well known to those skilled in the art and hence, the source 66 will be taken as direct current source. The other terminal of this source is connected by wire 67 to one terminal of the door operated switch 68 which is closed when the door is in closed position as shown. The other terminal of this switch is connected by wire 69 to spring finger 71 of a suitable control switch 70. This switch has five other spring fingers, 72, 73, 74, 75 and 76. The operating member of the switch is provided with two contacts 77 and 78 as shown. The switch is shown in the position when the door is closed.

Spring fingers 76 and 73 are connected together and grounded as indicated at 79. Spring finger 74 is connected by wire 83 to one terminal of door switch 84 which is normally open when the door is closed. The other terminal of this switch is connected to wire 67. Spring fingers 72 and 73 are connected by the wires 80 and 81 to the armature windings of the motor 16. Connected across these wires is an electromagnet coil 82 which controls a normally open switch 62. Wire 60 which extends from a suitable current source, preferably the same source 66, is connected to one of the D. C. input slip rings and is connected by wire 65 to one of the terminals of field winding of motor 16. The other wire 61 from this source is connected to the switch 62. The other D. C. slip ring is connected by wire 63 to the fixed contact of the switch 62 and by wire 64 to the other terminal of the field winding of motor 16. The four slip rings are connected through their corresponding spring fingers to the field windings 8 of the motor 7 by means of wires 85, 86, 87 and 88.

Connected in wire 61 is an electro-magnet 97 which when energized withdraws the pivoted latch bolt 98 out of the path of the door to unlock the door.

To open, the door switch 70 is operated to a position so that contact 77 interconnects spring fingers 71 and 72 and contact 78 interconnects spring fingers 75 and 76. Current then flows from source 66 through wire 67, switch 68, wire 69, spring finger 71, contact 77, spring finger 72, wire 80, the armature of motor 16, wire 81, spring finger 75, contact 78, spring finger 76 and back through the ground connection 79 to the other side of the current source.

At the same time that the armature of the motor is energized, the electro-magnet 82 is energized closing switch 62. Current then flows from the source through wire 60, wire 65, field winding of motor 16, wire 64, switch 62 and back to the other side of the current source through wire 61 and electro-magnet 97. The energization of magnet 97 withdraws bolt 98 and unlocks the door. At the same time, direct current is supplied to the direct current slip rings. Motor 16 is thus energized and causes the converter to operate with the result that two phase alternating current is supplied to the winding 8 of the linear induction motor to provide a moving field equivalent to the revolving field of an induction motor. This varying will introduce currents into the short circuited copper bars of the armature 9 causing reaction which is produced so as to cause the door to open. As the door opens, switch 84 closes and as the door attains full open position, switch 68 opens deenergizing the system. To close the door, switch 70 is operated back to the position shown in Fig. 6 to effect reversal of motor 16 whereby alternating current is supplied to the linear induction motor to cause the door to close. Just as the door is fully closed, switch 84 is opened with the result that the motor is deenergized.

With the above description it will be apparent that with a single control switch, the converter is put in operation and the linear induction motor energized to open and close the door, and the door operated switches effect deenergization of the motor as the door reaches its limit of travel in each direction.

Experience has shown that with a mechanism of this type, the door operates satisfactorily and opens and closes within the speed requirements of the present practice of door operation when the motor is supplied with an alternating current of about a frequency of three and one-half cycles per second. The frequency can, of course, be controlled by the speed of operation of motor 16 which likewise may be readily controlled as desired. Although the actual speed of the door, operated with such a mechanism appears to be somewhat slower than that attained by the use of fluid pressure engines, the time required to open and close the door is the same with a current of such a frequency, because the door starts more quickly. Another advantage of this system, is that a door of light construction can be employed and since its only connection with the moving force is provided with a magnetic field, there is no danger of injury to passengers struck by the door. The door being of light weight, and having no physical connections to operate it, it easily stops when it strikes a person in its path when closing. There are many other advantages of this system such as the simplicity of the equipment involved effecting an elimination of compressors, reservoirs, pipes, valves and engines as distinguished from the present common practice of employing fluid pressure apparatus for operating the doors. The invention has many other advantages to those skilled in the art.

The mercury switch converter may assume forms as illustrated for example in Fig. 7 where only two mercury switches are employed, each having a common electrode and four separate electrodes positioned at 90 degrees with respect to each other as illustrated in Fig. 8. These independent electrodes are cross-connected as shown and when the switches are revolved on their axis, an alternating current is produced similar to that produced by the arrangement of Fig. 5. In the case of this arrangement, the transverse wall with an aperture is not necessary since the mercury pool remains at the lowest point of the tubes and the individual electrodes dip into it as the tubes 90 and 91 revolve. The common electrodes 92 and 93 in the form of discs, are always in the mercury similar to the electrodes 50 and 51 of the tube of Fig. 3 which electrodes are likewise in the form of discs. The direct current to the modified arrangement of Fig. 7 is supplied to the common electrodes 92 and 93 through the wires 94 and 95.

From the above description it will be apparent that this invention resides in certain principles of construction and operation which may be embodied in other physical forms of apparatus by those skilled in the art, without departure therefrom. I do not, therefore, desire to be strictly limited to the disclosure as given for purpose of illustration, but rather to the scope of the appended claims.

What I seek to secure by United States Letters Patent is:

1. Means for transforming direct current into polyphase alternating current including a rotatable carrier, means for rotating the carrier on its axis, a plurality of pairs of vessels mounted on said carrier in longitudinally spaced relation, the plane of the axes of each pair of vessels being displaced 90° with respect to the plane of axes of the next adjacent pair of vessels, each vessel being partially filled with a conducting fluid and having a pair of electrodes extending into the interior thereof, means for supplying direct current to one electrode of each vessel, and polyphase alternating current supply connections from the remaining electrodes of the vessels.

2. In the apparatus of claim 1, the electrodes being in the form of discs and each vessel having an apertured insulating wall between the electrodes thereof, the apertures in the discs of one pair of vessels being displaced 90° with respect to the apertures in the discs of the next adjacent pair of vessels.

EDWARD G. PARVIN.